Figure 1:
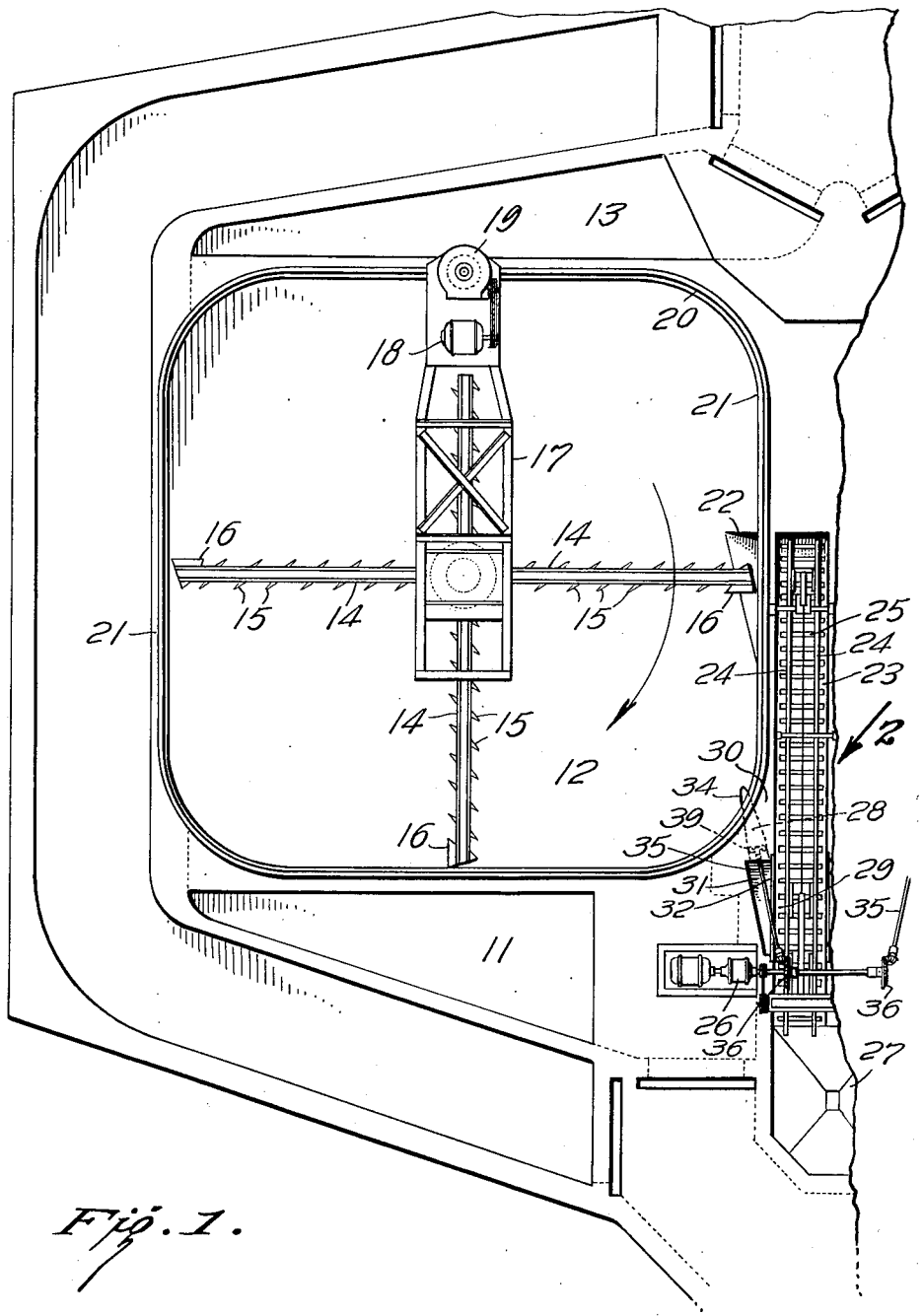

Jan. 31, 1933.  N. B. LUND  1,895,674
DETRITOR
Filed July 22, 1931  2 Sheets-Sheet 1

INVENTOR
NELS B. LUND,
BY
ATTORNEY

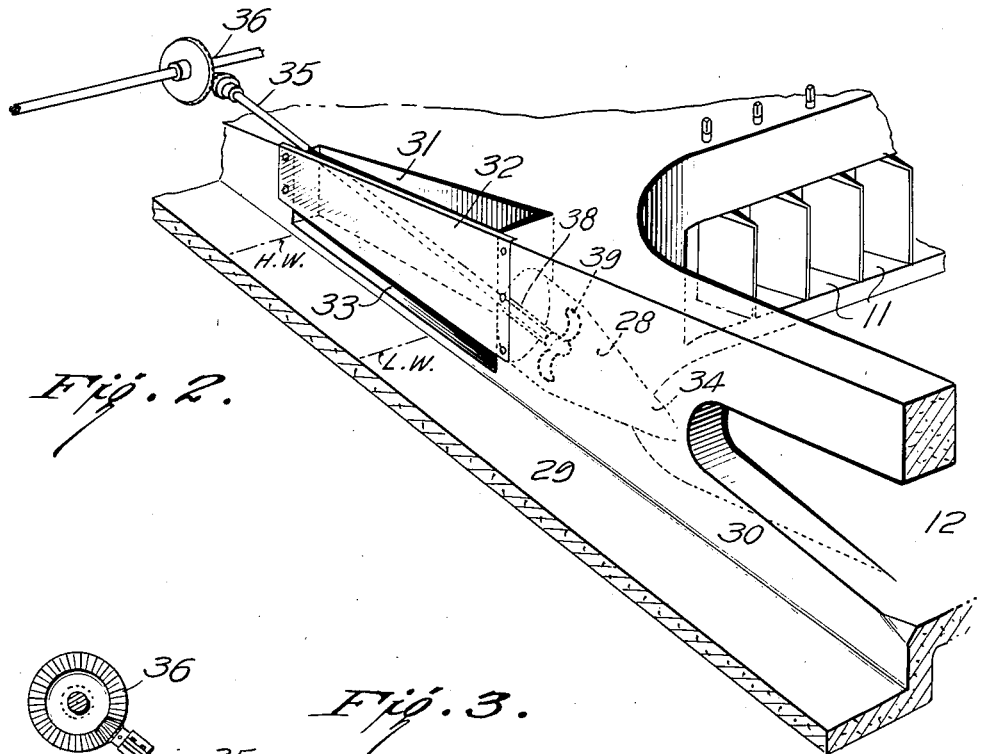
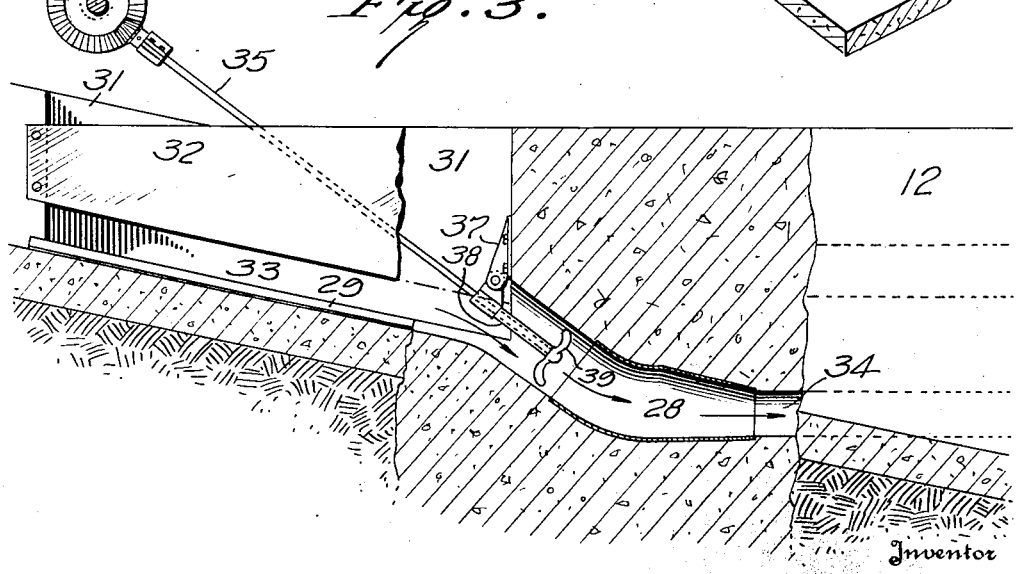

Patented Jan. 31, 1933

1,895,674

UNITED STATES PATENT OFFICE

NELS B. LUND, OF SEAFORD, NEW YORK, ASSIGNOR TO THE DORR COMPANY, INC., OF NEW YORK, N. Y., A CORPORATION OF DELAWARE

DETRITOR

Application filed July 22, 1931. Serial No. 552,381.

This invention relates to the treatment of detritus-bearing liquids, such as sewage wherein the liquid has several kinds of solids which require to be separated from each other. The invention then relates to an improvement on the Dorr type of detritors.

In such a machine the sewage flows into a sedimentation chamber where hydro-separation takes place in that the solids settle to the bottom of the chamber during liquid flow thereacross. A mechanism is provided in the chamber for conveying the settled solids to be operated upon a stratifier or classifier device (preferably of the Dorr type) which separates the gritty solids from the organic solids. The gritty solids are expelled from the classifier while the organics are returned to the sedimentation chamber so this invention relates more particularly to the return of the organics to the sedimentation chamber.

That is, the organics are returned to the sedimentation chamber in a carrier liquid through a conduit or channel extending from the point of their discharge from the classifier into the sedimentation chamber below the liquid level thereof. This invention therefore resides in giving the organic return flow a sufficient impetus to overcome all factors acting to counteract its normal flow, and also to overcome any tendency of the organic solids to build up in and clog the organics return channel. Specifically this is done by positively increasing the velocity of the organics return flow by impelling devices like a propeller, which is preferably of the weedless type.

For the purpose of illustrating the invention, drawings accompany this specification in which Figure 1 shows a plan view of a detritor, or rather one half of a usual detritor installations for the parts shown are usually duplicated but in reverse order. Fig. 2 shows a perspective view of the organics return, while Fig. 3 shows a vertical view through the organics return with parts in section.

In the drawings, the numeral 11 indicates the sewage inflow into the hydroseparating or sedimentation chamber 12 and outflow at 13. Within the chamber 12 are mechanisms for conveying solids settled on the bottom of the chamber to be operated upon for classification thereof, which consist in radially placed arms 14 equipped with sludge plowing blades 15 and end scoops 16. These arms are rotated by means of a central vertical shaft or tube (shown in dotted lines) to which motion is imparted by a traction bridge or arm 17 which derives its power from a motor 18 operating a traction device 19 engaging a track 20 located upon the peripheral wall 21 defining the limits of the chamber 12.

Relatively slow rotation of the radial arms 14, through the medium of their blades 15 and scoops 16, sweeps the sludge or settled solids along the bottom of the chamber 12 until they reach a solids discharge 22 located marginally of the chamber 12, down whose inclined bottom they slide to deposit themselves in position to be operated upon by the inclined classifier 23 whose lower end is lower than the bottom of the chamber 12 and whose upper end is higher than the maximum water level in the chamber.

The classifier preferred for this embodiment of my invention comprises a partially submerged conveying or reciprocable element having longitudinal bars 24 with transverse rakes 25 depending therefrom. The bars and rakes are unitarily reciprocated in a well-known manner to wash and classify the solids conveyed thereinto with their carrier liquid. The reciprocation is produced by a motor and associated mechanisms indicated at 26. The gritty solids after being separated from the organic solids are discharged from the non-submerged upper end of the classifier into a collecting hopper 27. The organics separated from the organics in the zone of emergence of the classifier rakes from the carrier liquid are returned to the chamber 12 through a channel 28 extending more or less laterally from the classifier in a vertical zone including the liquid level within the chamber 12.

The foregoing has been described to make clear the relationship of the organics return so it has been made more general than if invention resided therein.

The operation of the parts so far described is that the sewage flows into and across the chamber 12, exiting at 13. During this flow, solids therein settle out onto the bottom of the chamber 12. They are conveyed by the rotating arms 14 to be discharged through the solids discharge 22 onto the lower end of the classifier 23. In this device the gritty solids are separated from the organic solids at substantially the liquid level therein and exit from the classifier into the hopper 27 while the organic solids are returned to the chamber 12 through channel 28. Sewage flowing from the chamber 12 through outlet 13 is further treated in a well known manner involving such steps as sedimentation and digestion.

To be specific as to the organics return of this invention, it is pointed out that the classifier has an inclined bottom deck 29 and a side wall 30 which is a common wall between it and the chamber 12. In the zone of emergence of the classifier rakes and in the vertical zone of the liquid level of the chamber 12 which varies between high water and low water as indicated in Fig. 2 by "H. W." and "L. W." respectively, a recess 31 is provided in the wall 30, entrance to which is partially closed off by means of a plate 32 which leaves a restricted slotted opening 33 therebelow. The function of this restricted opening, through which a considerable flow is set up laterally from the classifier by the impeller 39, is to develop a transverse current across the classifier to give a skimming action whereby any solids thrown into suspension above the sand bed, are drawn through the slot 33 and carried off.

Recess 31 has its bottom elevated above the plate 32 to offer a protecting weir to prevent the gritty solids from being caught in the cross-current just described and leads into a channel or conduit 28 extending therefrom to the chamber 12 at a point adjacent to its bottom. The conduit 28 preferably is provided with a restricted outlet 34 to provide sufficient velocity to prevent depositing of any solids in conduit and to mildly eject the organics well into the chamber 12 to overcome any liquid current action therein to wash them back into the conduit. Into the conduit extends a shaft adapted to be rotated by gearing 36 or other suitable driving means deriving power either from the main motor 18 or a separate motor whichever happens to be the most desirable.

The shaft 35 is supported by any convenient device such as a bracket and bearing 37 which may also have associated with it a stationary sleeve 38. A propeller 39, preferably of the weedless type is carried by the shaft 35.

The organic solids tending to flow laterally from the classifier in the zone of emergence of the bladed classifying or raking elements from the liquid are washed or separated from the gritty solids by the classifier and pass into the organic return channel 28. Here they encounter the impelling propeller 39 which gives them a positive impetus to project them through the channel 28 and to eject them therefrom well into the chamber 12 with sufficient force to overcome any tendency to lag in and clog the channel 28. The propeller is of the weedless marine type because sometimes waste rags or other elongated and flexible débris get into the organics channel which would normally interfere with the rotation of the propeller by wrapping themselves therearound, whereas a weedless propeller will repel them. For very much the same reason the stationary sleeve 38 is provided to prevent the rags and so on from winding up on the propeller shaft. It is to be understood that of course, while solids, gritty solids, and organic solids have been referred to, they are actually in suspension and carried by sufficient liquid as to be easily fluid.

Thus there has been devised an arrangement for keeping the organics return in a detriting apparatus freely operating against liquid head and liquid current tendencies to cause it to back flow; and against all tendencies to clog it up. There has been shown herein one embodiment of the invention in order to make the invention clear, but obviously other embodiments and modifications can be made without departing from the spirit and scope of the invention. For instance, the propeller may be operated on a vertical axis, so long as any impulse is given to the organic solids and other than reciprocating types of classifiers may be used.

What is claimed is:

1. A detriting apparatus comprising a sedimentation chamber, a classifying device, a partially submerged conveying mechanism therein for separating organic solids from gritty solids in the zone of liquid emergence thereof, a grit outlet at the upper end of said conveying mechanism, mechanism for conveying solids settled in said chamber to be operated upon by said classifying device, and means for projecting organic solids into said chamber laterally from the zone of emergence of said partially submerged conveying mechanism of said classifying device.

2. A detriting apparatus comprising a sedimentation chamber, a classifying device, a partially submerged conveying mechanism therein for separating organic solids and gritty solids in the zone of liquid emergence thereof, a grit outlet at the upper end of said conveying mechanism, mechanism for conveying solids settled in said chamber to be operated upon by said classifying device, an organic solids return to said chamber from the zone of emergence of said conveying mechanism in said classifying device, and impelling means in said return.

3. A detriting apparatus comprising a sedimentation chamber, a classifying device, a partially submerged conveying mechanism therein for separating organic solids and gritty solids in the zone of liquid emergence thereof, a grit outlet at the upper end of said conveying mechanism, mechanism for conveying solids settled in said chamber to be operated upon by said classifying device, an organic solids return to said chamber from the zone of emergence of said conveying mechanism in said classifying device, and a propeller in said return.

In testimony whereof I have affixed my signature to this specification.

NELS B. LUND.